United States Patent
Iwabuchi (10) Patent No.: US 6,195,498 B1
(45) Date of Patent: *Feb. 27, 2001

(54) IMAGE REPRODUCING APPARATUS CAPABLE OF CHANGING REPRODUCING SPEED

(75) Inventor: Yoshitsugu Iwabuchi, Kawasaki (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/979,486

(22) Filed: Nov. 28, 1997

Related U.S. Application Data (63) Continuation of application No. 08/449,430, filed on May 24, 1995.

(30) Foreign Application Priority Data

May 25, 1994 (JP) .................................................. 6-111022

(51) Int. Cl.[7] ...................................................... H04N 5/91
(52) U.S. Cl. .................................. 386/68; 386/69; 386/95
(58) Field of Search ............................ 386/4, 6.8, 52–53, 386/55, 64–65, 68, 95, 69; 360/13, 69; 369/47, 54, 58; H04N 5/91

(56) References Cited

U.S. PATENT DOCUMENTS

| | | | |
|---|---|---|---|
| 4,675,755 | * 6/1987 | Baumeister et al. | 360/35.1 |
| 4,689,022 | * 8/1987 | Peers et al. | 434/307 |
| 5,157,511 | * 10/1992 | Kawai et al. | 386/68 |
| 5,270,828 | * 12/1993 | Mogi | 358/335 |
| 5,276,559 | * 1/1994 | Sarkisian et al. | 360/18 |
| 5,329,375 | * 7/1994 | Juri et al. | 358/343 |
| 5,333,015 | * 7/1994 | Harigaya et al. | 348/578 |
| 5,425,100 | * 6/1995 | Thomas et al. | 380/20 |
| 5,428,774 | * 6/1995 | Takahashi et al. | 368/68 |
| 5,486,930 | * 1/1996 | Iketani et al. | 358/335 |
| 5,543,929 | * 8/1996 | Mankovitz et al. | 358/335 |

* cited by examiner

*Primary Examiner*—Wendy Garber
*Assistant Examiner*—Vincent F. Boccio
(74) *Attorney, Agent, or Firm*—Morgan & Finnegan, L.L.P.

(57) ABSTRACT

There is provided an apparatus in which scenario data indicative of a reproducing procedure of image data is reproduced and when the image data is reproduced on the basis of the reproduced scenario data, the contents of the reproduced scenario data are changed, and the images are reproduced on the basis of the scenario data whose contents were changed, so that a special reproduction such as a fast forward reproduction or the like can be performed. An image reproducing apparatus in which the whole reproduction images based on the scenario data can be easily recognized and a use efficiency is good is provided.

17 Claims, 8 Drawing Sheets

FIG. 2

| | FIRST TERM | SECOND TERM | THIRD TERM | FOURTH TERM | |
|---|---|---|---|---|---|
| | 0000 | START | | | ROW 1 |
| | 0010 | A IMAGE | to FM0 | | ROW 2 |
| | 0020 | DISSOLVE | to FM0 | 6 | ROW 3 |
| | 0030 | B IMAGE | to FM 1 | | ROW 4 |
| PROCESSING DIRECTION | 0040 | DISSOLVE | to FM 1 | 4 | ROW 5 |
| | 0050 | C IMAGE | to FM 0 | | ROW 6 |
| | 0060 | DISSOLVE | to FM 0 | 2 | ROW 7 |
| | 0070 | END | | | ROW 8 |

| | FIRST TERM | SECOND TERM | THIRD TERM | FOURTH TERM | |
|---|---|---|---|---|---|
| | 0000 | START | | | ROW 1 |
| | 0005 | A IMAGE | to FM0 | | ROW 2 |
| | 0010 | DISSOLVE | to FM0 | 3 | ROW 3 |
| PROCESSING DIRECTION | 0015 | B IMAGE | to FM 1 | | ROW 4 |
| | 0020 | DISSOLVE | to FM 1 | 2 | ROW 5 |
| | 0025 | C IMAGE | to FM 0 | | ROW 6 |
| | 0030 | DISSOLVE | to FM 0 | 1 | ROW 7 |
| | 0035 | END | | | ROW 8 |

IMAGE REPRODUCING APPARATUS CAPABLE OF CHANGING REPRODUCING SPEED

This is a continuation of co-pending application Ser. No. 08/449,430, filed on May 24, 1995.

BACKGROUND OF THE INVENTION

1. Field of the Invention

The invention relates to an image reproducing apparatus and, more particularly, to an apparatus for reproducing images in accordance with scenario information showing a reproducing procedure.

2. Related Background Art

In recent years, since such a kind of image reproducing apparatus can reproduce a natural image at a high quality, it is used in an art museum or the like and is used for explanation of an exhibition article or the like by automatically reproducing the natural image as a program.

In case of reproducing such a program, an order and time to reproduce data such as image, audio, character, and the like which were recorded and a picture plane switching effect such as wipe, dissolve, or the like need to be previously registered as scenario information.

Generally, such a registration of the scenario of the program is realized by forming a data file (hereinafter, referred to as a scenario file) of a character train in a text file format on a computer.

To form an effective program in the reproduction by the image reproducing apparatus as mentioned above, it is important to make such a scenario. For this purpose, in many cases, such a scenario formation is accompanied with an edition of the scenario file by trials of a plurality of number of times. In such a program, not only the automatic reproduction but also an interactive reproduction such as to retrieve a desired scene or image are needed. Further, in a preview upon edition of those programs or in a retrieval upon reproduction of the program, a fast forward function of the program is effective.

However, in the conventional apparatus, although an interlace function for designating and retrieving only a desired image is considered, nothing is considered with respect to a function for reproducing a program while fast forward feeding the program.

Therefore, to grasp the whole scenario of the program, it cannot help confirming it by the ordinary reproduction and it takes a long time.

SUMMARY OF THE INVENTION

It is an object of the invention to solve the problems as mentioned above.

Another object of the invention is to provide an apparatus which can change a reproducing speed even in an apparatus for reproducing images on the basis of scenario information indicative of a preset reproducing procedure.

Under such objects, according to an aspect of the present invention, there is provided an image reproducing apparatus comprising reproducing means for reproducing images on the basis of scenario information showing a reproducing procedure of the images and control means for controlling the reproducing means so as to reproduce said images by the reproducing order shown by the scenario information and at a reproducing speed different from an ordinary reproducing speed.

The above and other objects and features of the present invention will become apparent from the following detailed description and the appended claims with reference to the accompanying drawings.

DETAILED DESCRIPTION OF THE PREFERRED EMBODIMENTS

An embodiment of the invention will now be described in detail hereinbelow with reference to the drawings.

Figure 1:
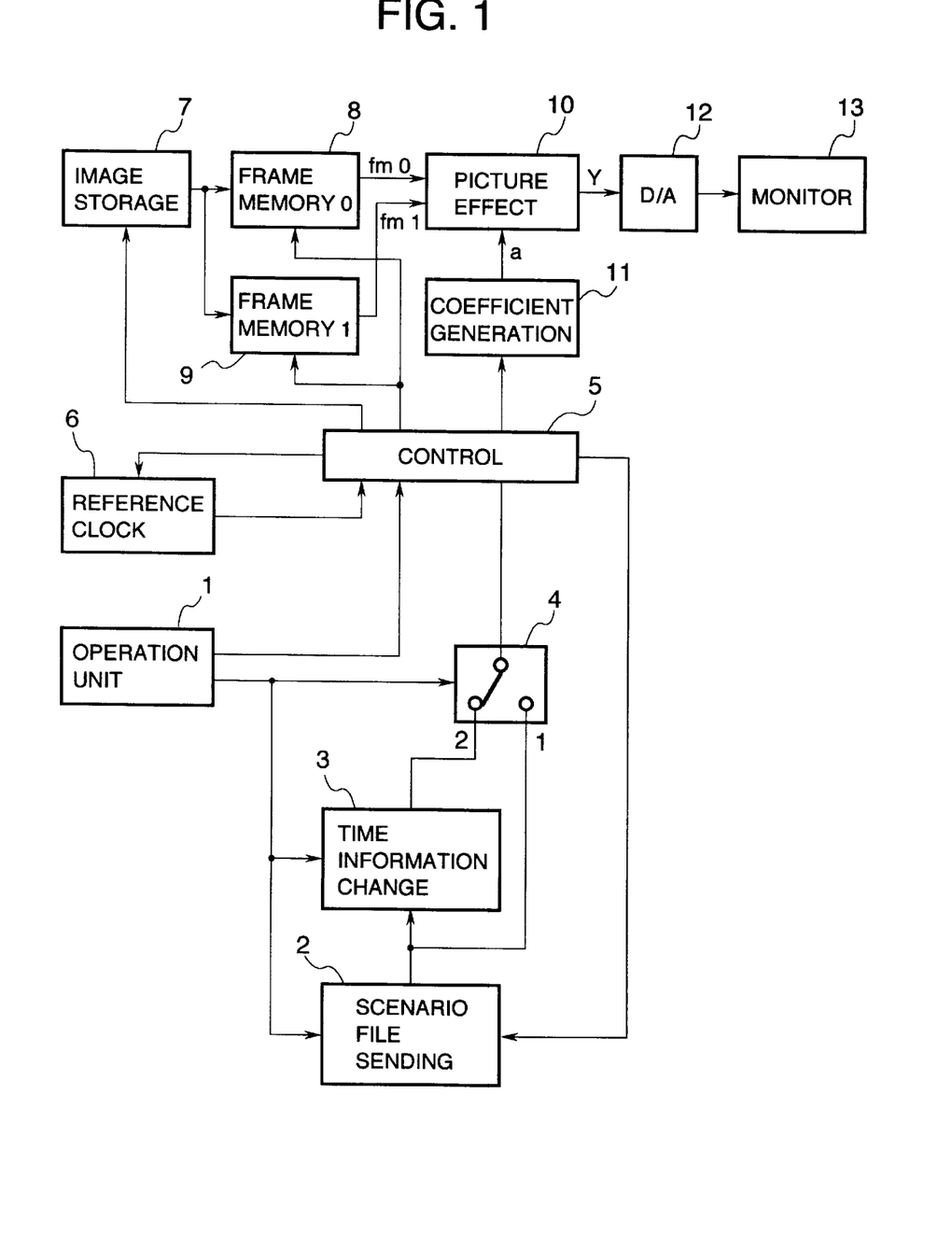
FIG. 1 is a block diagram showing a construction of an image reproducing apparatus according to an embodiment of the invention.

FIG. 1 is a block diagram showing a construction of an image reproducing apparatus according to the first embodiment of the invention.

The operation in an ordinary reproducing mode will be first described.

In FIG. 1, reference numeral 1 denotes an operation unit to perform an operation by instructing a reproduction or the like to the apparatus by a viewer. When the operator instructs the ordinary reproduction by the operation unit 1, such an instruction signal is outputted to a scenario file sending circuit 2, a time exchange circuit 3, a switch 4, and a control unit 5.

The switch 4 is connected to a terminal 1 by an instruction from the operation unit 1. The scenario file sending circuit 2 reads out a scenario file recorded in a floppy disk, a hard disk, or the like (not shown) and outputs to the time exchange circuit 3, and also outputs to the control unit 5 through the switch 4. The time exchange circuit 3 will be described hereinlater.

Figure 2:
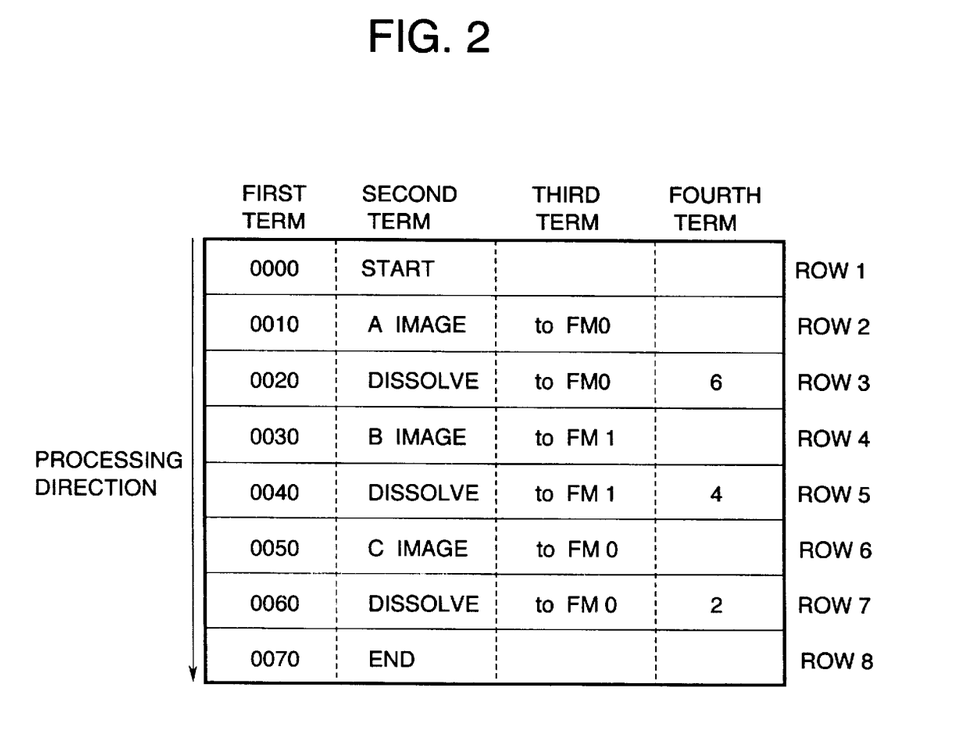
FIG. 2 is a diagram showing a state of a scenario file according to the first embodiment.

FIG. 2 shows a state of the scenario file. The scenario file is information showing a reproducing procedure of the image and is separated to four terms as shown in FIG. 2. One row in each term indicates one command. In FIG. 2, a command start time is described in the first term. A main command is described in the second term. A memory instruction is described in the third term. A picture plane effect time is described in the fourth term.

For example, the second row denotes "an A image is transferred to the 0-th frame memory (hereinafter, referred to as an FM) at time 10 seconds". The third row denotes "the display is switched from the image of the first FM to the image of the 0-th FM at time 20 seconds by a wipe of six seconds". The first row and the eighth row indicate the head and end of a sequence file.

Returning again to FIG. 1, the control unit 5 receives the scenario file and controls an image storage unit 7, a 0-th FM 8, a first FM 9, a coefficient generation circuit 11, and a reference clock 6 in accordance with a command of every row.

The control unit 5 which received the first row in FIG. 2 resets a time of the reference clock 6 to 0 second and sends a transmission command of the second row to the scenario file sending circuit 2. The control unit 5 which received the second row transfers the data of the A image recorded in the image storage unit 7 to the 0-th FM 8 at a time point when the time of the reference clock 6 indicates 10 seconds. The control unit 5 subsequently transmits a sending command of the third row to the scenario file sending circuit 2. The control unit 5 which received the third row controls the coefficient generation circuit 11 at a time point when the time of the reference clock 6 indicates 20 seconds, generates an image effect coefficient $\alpha$, and outputs to an image effect circuit 10.

The image effect circuit 10 executes processes on the basis of the following equation by the value of $\alpha$ inputted, the data (fm0) read out from the FM 8, and the data (fm1) read out from the FM 9.

$$Y = \alpha(fm1 - fm0) + fm0 = \alpha fm1 + (1-\alpha)fm0$$

Therefore, by changing the value of the coefficient $\alpha$ which is generated from the coefficient generation circuit 11 from 11 to 0 for six seconds, a dissolve effect of six seconds from the image according to fm0 to the image according to fm1 can be accomplished. After the control of the value of $\alpha$ was performed, the control unit 5 generates a command to send the fourth row.

In a manner similar to the above, the control unit 5 executes a control in accordance with a command. A digital signal Y which is outputted from the image effect circuit 10 is converted to an analog signal by a D/A conversion circuit 12 and is displayed on a monitor 13.

Figure 3:
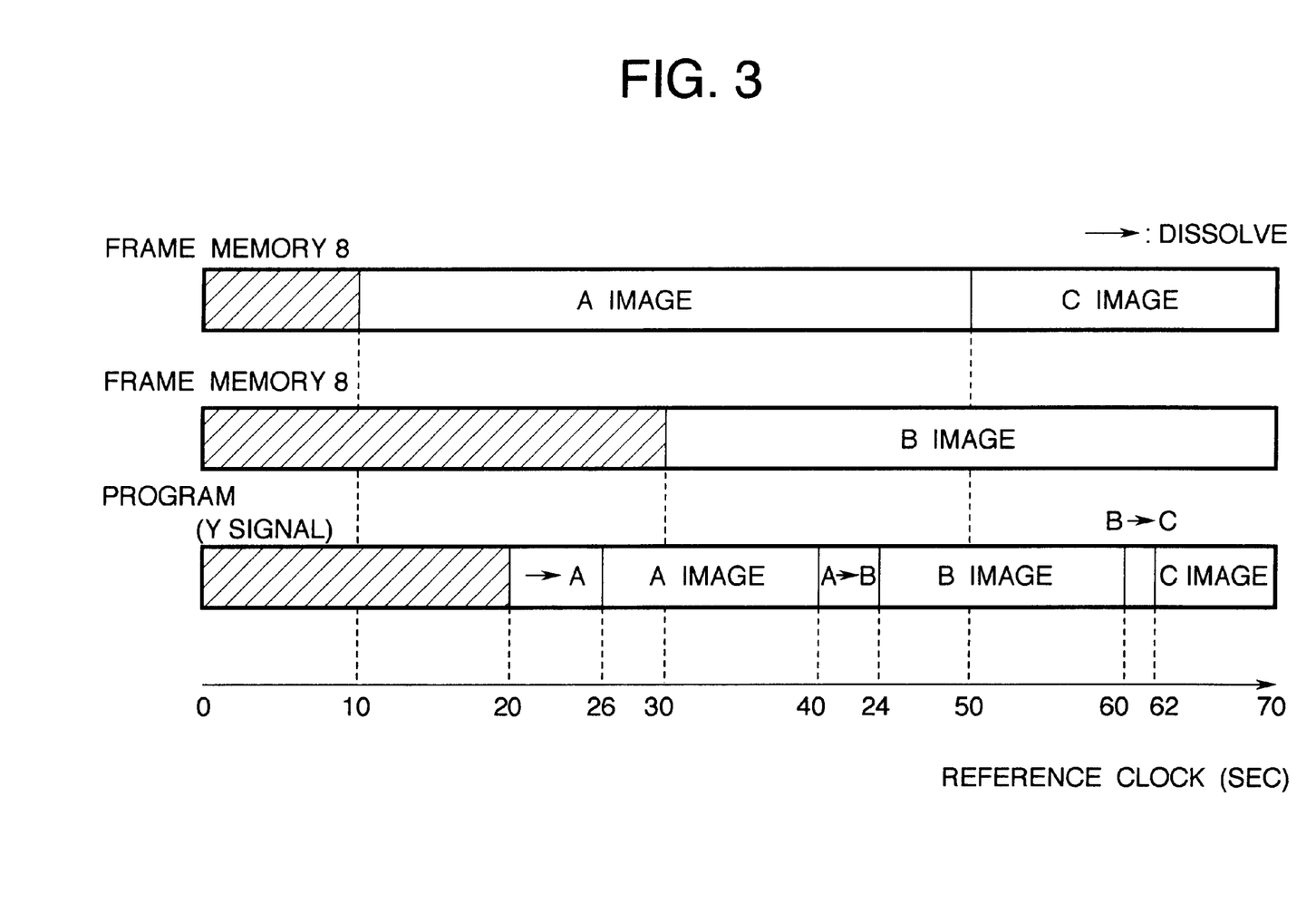
FIG. 3 is a time chart showing a state in an ordinary reproducing mode in the first embodiment of the invention.

FIG. 3 is a time chart showing a state of the ordinary reproduction mentioned above. An axis of abscissa denotes a time which is outputted from the reference clock 6. An upper stage indicates a kind of image data recorded in the FM 8. A middle stage indicates a kind of image data recorded in the FM 9. A lower stage indicates a state of the signal Y that is outputted from the image effect circuit 10.

The operation in the fast forward reproducing mode will now be described.

When the operator instructs the fast forward reproduction by the operation unit 1, the switch 4 is connected to the terminal 2 side by such an instruction signal. The scenario file sending circuit 2 sends a scenario file to the time exchange circuit 3 in a manner similar to the ordinary reproducing mode.

Figure 4:
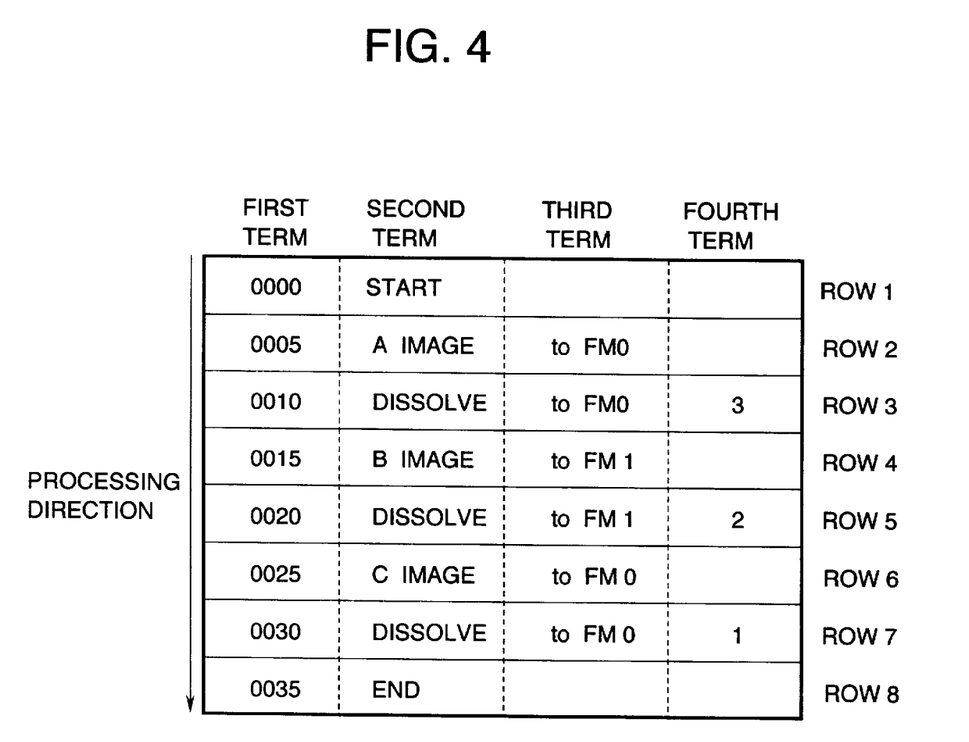
FIG. 4 is a diagram showing a state of a scenario file after conversion in the first embodiment of the invention.

By an instruction from the operation unit 1, the time exchange circuit 3 extracts a time and a time duration value of each command of the inputted scenario file and changes the time duration value to a value corresponding to a fast forward reproducing speed. In the embodiment, it is now assumed that the fast forward reproduction is set to a double-speed reproduction for simplicity of explanation. In this case, the time exchange circuit 3 changes the inputted time to the value of ½ thereof. As data to be changed, for example, since the command start time of the first term or the image effect time of the fourth term corresponds to such data. Therefore, those values are respectively changed to ½ of those values and are outputted to the control unit 5 through the switch 4. FIG. 4 shows states of a scenario file that is equivalent to the scenario file after the change.

The control unit 5 executes the control as mentioned above on the basis of the scenario file in which each time information was changed as mentioned above. Therefore, processes of each time series are executed at a speed that is twice as high as the speed in the ordinary reproducing mode mentioned above.

Figure 5:
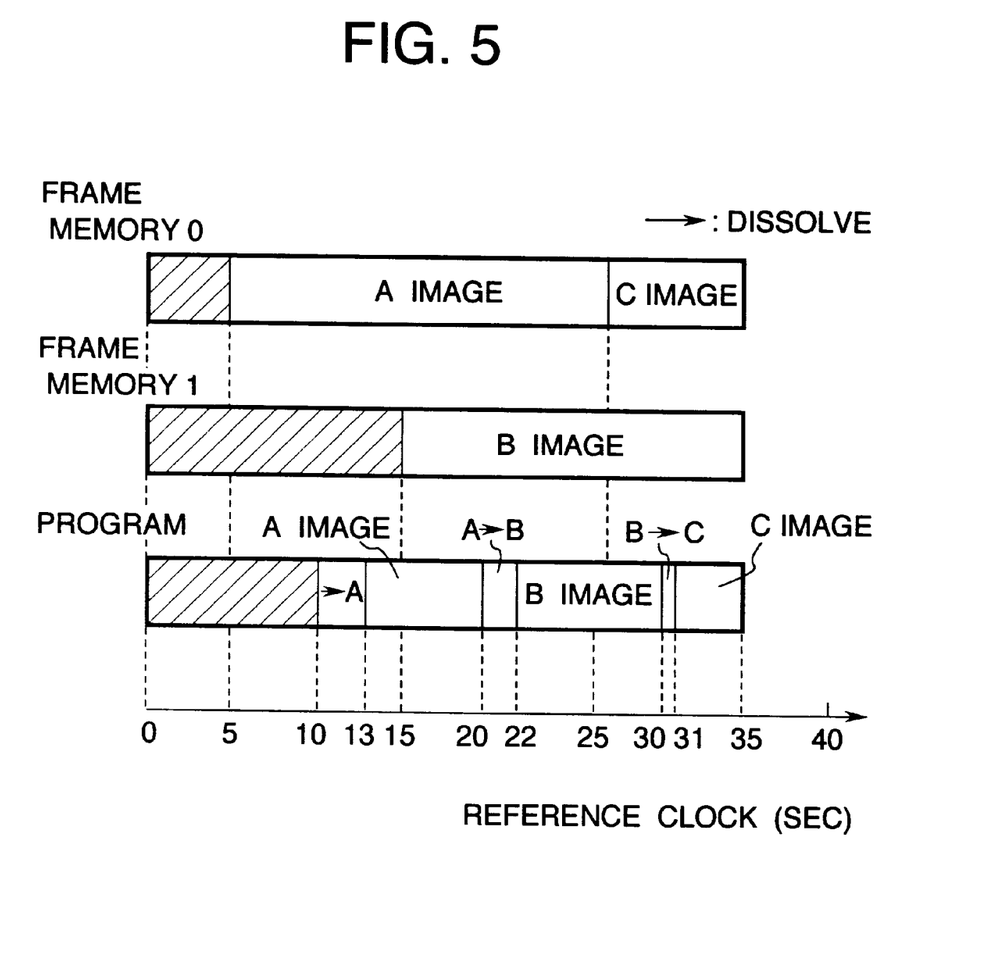
FIG. 5 is a time chart showing a state in a fast forward reproducing mode in the first embodiment of the invention.

FIG. 5 is a time chart showing a state in case of the fast forward reproducing mode. As will be obviously understood in comparison with FIG. 3, the double-speed reproduction can be performed.

The second embodiment of the invention will now be described with reference to FIG. 6.

Figure 6:
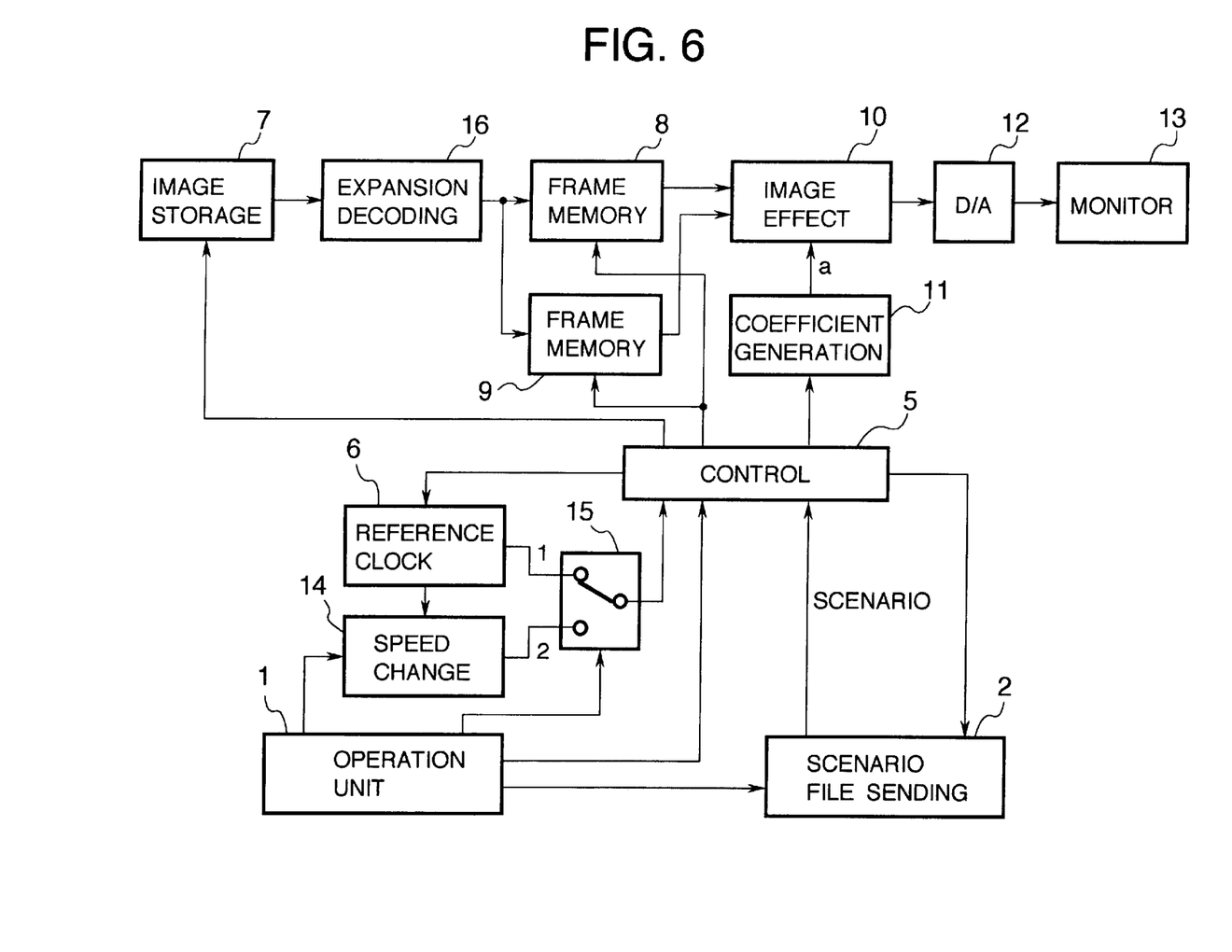
FIG. 6 is a block diagram showing another construction of an image reproducing apparatus as an embodiment of the invention.

FIG. 6 is a block diagram showing a construction of an image reproducing apparatus according to the second embodiment of the invention. The operation in the fast forward reproducing mode in the apparatus of FIG. 6 will now be described hereinbelow.

In FIG. 6, when the operator instructs the fast forward reproduction, a switch 15 is connected to the terminal 2 side. In a manner similar to the foregoing embodiment, the scenario file sending circuit 2 sends the scenario file to the control unit 5.

The control unit 5 which received the first row of the scenario file resets the reference clock 6 as mentioned above. The reference clock 6 counts the time from the time point when it was reset by the control unit 5 and outputs the counted time to a speed change circuit 14. By an instruction from the operation unit 1, the speed change circuit 14 counts the time at a speed that is twice as high as that of the reference clock from a time point when the time was outputted from the reference clock 6 for the first time.

Figure 7:
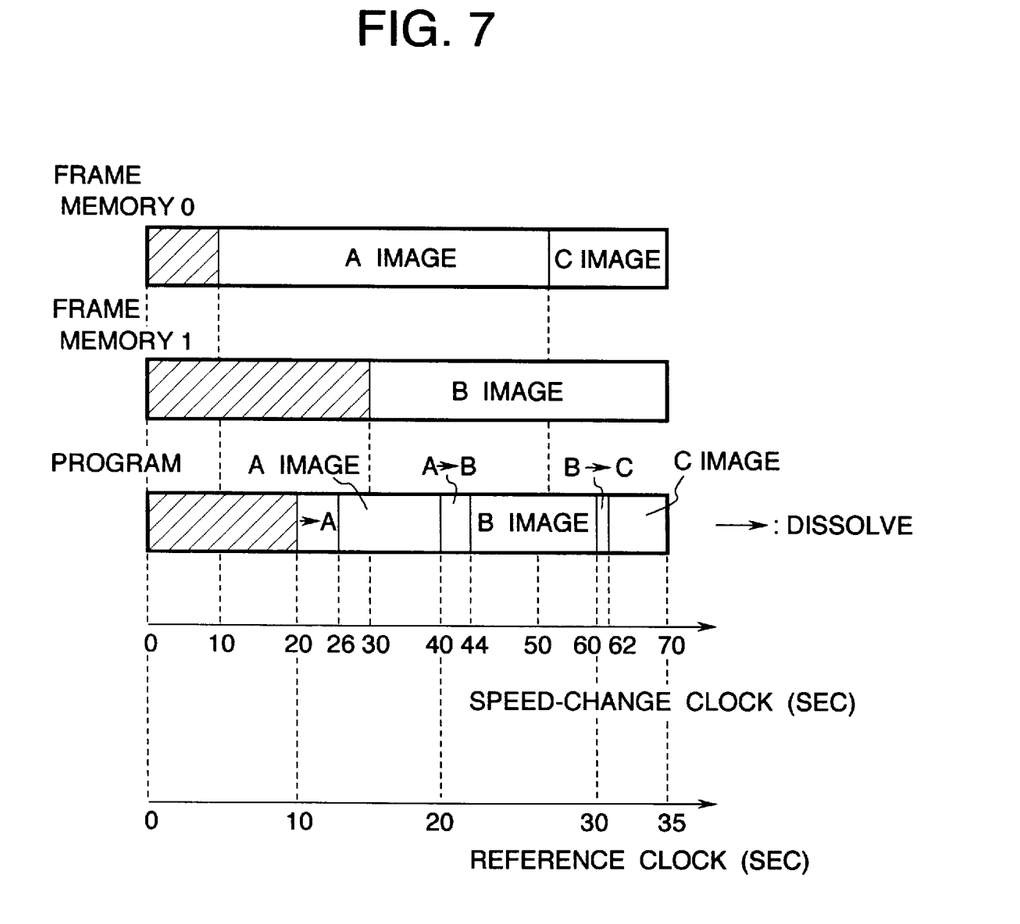
FIG. 7 is a time chart showing a state of the operation in the second embodiment of the invention.

The control unit 5 executes a control similar to that in the foregoing embodiment on the basis of the time which was outputted from the speed change circuit 14 and is counted at the double speed. Even in the second embodiment, therefore, the fast forward reproduction can be executed at the double speed. FIG. 7 shows a state of the output signal of the image effect circuit 10 in the embodiment. In FIG. 7, an axis of abscissa denotes the time outputted from the speed change circuit 14.

In the embodiment, the image data stored in the image storage unit 7 has been compressed and encoded. The image data read out from the image storage unit 7 is subjected to the corresponding processes at the time of the storage by an expansion/decoding circuit 16 and is recorded in each FM.

Figure 8:
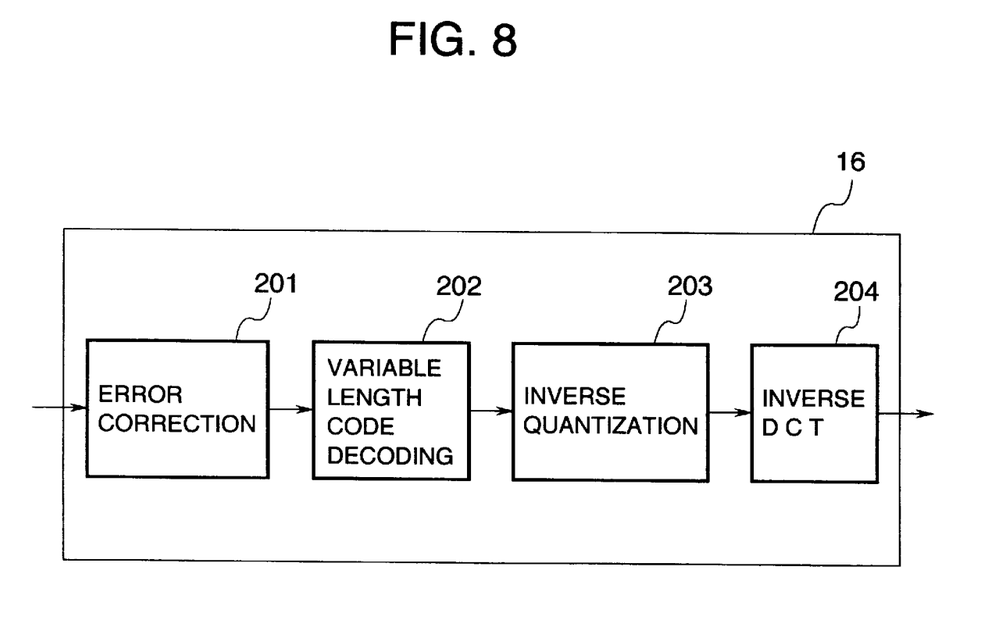
FIG. 8 is a block diagram showing a construction of an expansion/decoding circuit in FIG. 6.

FIG. 8 shows a construction of the expansion/decoding circuit 16.

In FIG. 8, the image data read out from the image storage unit 7 is sent to an error correction circuit 201, by which errors in the image data are first corrected by using a parity code added at the time of the data storage. The resultant error corrected image data is supplied to a variable length code decoding circuit 202.

The variable length decoding circuit 202 decodes the image data which has been subjected to variable length encoding such as Huffman encoding or the like and outputs the decoded image data to an inverse quantization circuit 203.

The inverse quantization circuit 203 inversely quantizes the image data by using a quantization coefficient corresponding to that used at the time of storage and outputs the inversely quantized image data to an inverse DCT circuit 204. The inverse DCT circuit executes an inverse discrete cosine transformation (inverse DCT) to the image data which was inversely quantized and converts from the data in a frequency region to the data in a spatial region and outputs the converted data to each of the FMs 8 and 9.

By such a construction as mentioned above, an information amount of the image data of the image storage unit 7 is expanded and decoded to the original image data.

In the foregoing embodiment, the image data and scenario file have separately been recorded and individually reproduced. However, it is also possible to record the image data and scenario file at one location and to reproduce them.

Although the above embodiment has been described with respect to the case of the fast forward reproduction at the double speed, it will be also obviously understood that the fast forward reproduction or slow reproduction can be performed at a reproducing speed other than the double speed. A special reproduction can be also executed by a similar construction with respect to the case of reproducing not only the image but also the voice, characters, and the like.

Further, in the first embodiment, an image can be reproduced in consideration of a taste of the viewer, easiness of watching, or the like by a method whereby all of the image effects are cut in the fast forward reproducing mode or the like by an application such that all of the image effect times are changed to 0 or the like.

Although each of the above embodiments has been described with respect to the case of reproducing the image data from the image storage unit 7, the invention is not limited to such an example. The invention can be also applied to any other apparatuses so long as images are reproduced in accordance with a predetermined procedure as in a case where image data and scenario file are transmitted by a radio wave or the like and is received and reproduced, or the like. Similar operations and effects are obtained.

The foregoing embodiments have been constructed so as to reproduce the image at a speed different from the speed in the ordinary reproducing mode in case of reproducing the image on the basis of the scenario information indicative of a predetermined reproducing procedure. Therefore, even in an apparatus for reproducing images by a predetermined procedure such as a scenario file or the like, a special reproduction such as a fast forward reproduction or the like can be executed.

What is claimed is:

1. An image reproducing apparatus, comprising:
    (a) reproducing means for reproducing images of a program on the basis of scenario information indicative of a reproducing procedure of the images;
    (b) mode instruction means for instructing a reproduction mode of said reproducing means between a plurality of reproduction modes including a normal reproduction mode and a special reproduction mode; and
    (c) control means for controlling said reproducing means according to the reproduction mode of said reproducing means instructed by said mode instruction means,
    said control means controlling said reproducing means so as to reproduce the images of the program at a normal reproduction speed corresponding to the normal reproduction mode and a predetermined reproduction speed corresponding to the special reproduction mode on the basis of a same procedure of the images indicated by the scenario information according to the reproduction mode instructed by said instruction means, the predetermined reproduction speed being different from the normal reproduction speed.

2. An apparatus according to claim 1, wherein said scenario information includes time management information indicative of an operation timing of said reproducing means, and said control means changes a value of said time management information in accordance with the reproducing speed of said images.

3. An apparatus according to claim 1, further comprising a reference clock for outputting reference time information, and wherein said reproducing means reproduces said images on the basis of output time information of said reference clock.

4. An apparatus according to claim 3, wherein said control means changes a value of the output time information of said reference clock in accordance with the reproducing speed of said images.

5. An apparatus according to claim 1, further comprising image storage means for storing the images,
    and wherein said reproducing means reproduces the images stored in said image storage means.

6. An apparatus according to claim 5, wherein as for the images stored in said image storage means, an information amount of said image has been compressed and such compressed image has been stored, and said reproducing means includes expansion means for expanding the information amount of the image reproduced from said image storage means.

7. An apparatus according to claim 1, wherein said image includes images of a plurality of picture planes and said reproducing means includes synthesizing means for synthesizing a plurality of picture planes in said reproduction images.

8. An apparatus according to claim 7, wherein said scenario information includes synthetic management information indicative of a synthesizing operation of said synthesizing means.

9. An image reproducing apparatus, comprising:
    (a) image reproducing means for reproducing image data of a program from a recording medium;
    (b) scenario reproducing means for reproducing scenario data indicative of a reproducing procedure of the image data of the program by said image reproducing means from a storage device, said image reproducing means reproducing the image data of the program according to the scenario data reproduced by said scenario reproducing means;
    (c) mode instruction means for instructing of a reproduction mode of said image reproducing means, the reproduction mode including a normal reproduction mode in which the image data of the program are reproduced at a normal reproduction speed and a special reproduction mode in which the image data of the program are reproduced at a predetermined reproduction speed different from the normal reproduction speed; and
    (d) control means for changing contents of the scenario data reproduced by said scenario reproducing means, said control means automatically changing the contents of the scenario data in response to an instruction of the special reproduction mode by said mode instruction means, wherein said reproducing means reproduces the image data of the program at the predetermined reproduction speed corresponding to the special reproduction mode according to the reproducing procedure indicated by the scenario data whose contents have been changed by said control means in the special reproduction mode.

10. An apparatus according to claim 9, wherein said scenario data includes time management data indicative of an operation timing of said image reproducing means, and said control means changes an image reproducing speed of said image reproducing means by changing a value of said time management data.

11. An apparatus according to claim 9, wherein said image data includes image data of a plurality of picture planes and said image reproducing means includes synthesizing means for synthesizing the image data of a plurality of picture planes in said reproduction image data.

12. An apparatus according to claim 11, wherein said scenario data includes synthetic management data to instruct a synthesizing operation of said synthesizing means, and said control means further controls the synthesizing operation of said synthesizing means by changing contents of said synthetic management data.

13. An image data reproducing apparatus, comprising:

(a) reproducing means for reproducing image data of a program from a storage device on the basis of scenario data indicative of a reproducing procedure of the image data of the program;

(b) mode instruction means for instructing a reproduction mode of said reproducing means between a plurality of reproduction modes including a normal reproduction mode and a special reproduction mode; and (c) control means for automatically changing contents of the scenario data in response to an instruction of the special reproduction mode by said mode instruction means, wherein said reproducing means reproduces the image data of the program at a predetermined reproduction timing corresponding to the special reproduction mode according to the reproducing procedure indicated by the scenario data whose contents have been changed by said control means in the special reproduction mode.

14. An apparatus according to claim 13, wherein said scenario data includes time management data indicative of an operation timing of said image reproducing means, and said control means changes said reproducing period of time by changing a value of said time management data.

15. An apparatus according to claim 13, wherein said image data includes image data of a plurality of picture planes, and said image reproducing means includes synthesizing means for synthesizing the image data of said plurality of picture planes in said reproduction image data.

16. An apparatus according to claim 15, wherein said scenario data includes synthetic management data to instruct a synthesizing operation of said synthesizing means, and said control means further changes said reproducing period of time by changing contents of said synthetic management data.

17. An image reproducing apparatus, comprising:

image reproducing means for reproducing image data of a program from a recording medium scenario reproducing means for reproducing scenario data indicative of a reproducing procedure of the image data of the program by said image reproducing means from a storage device, said image reproducing means reproducing the image data of the program according to the scenario data reproduced by said scenario reproducing means;

mode instruction means for instructing of a reproduction mode of said image reproducing means, the reproduction mode including a first reproduction mode in which the image data of the program are reproduced at a first predetermined reproduction speed and a second reproduction mode in which the image data of the program are reproduced at a second predetermined reproduction speed different from the first reproduction speed; and control means for automatically changing contents of a first scenario data reproduced by said scenario reproducing means, and for generating a second scenario data in response to an information of the second reproduction mode by said mode instruction means, wherein said image reproducing means reproduces the image data of the program at the first predetermined reproduction speed according to the reproducing procedure indicated by the first scenario data in the first reproduction mode and wherein said image reproducing means reproduces the image data of the program at the second predetermined reproduction speed according to the reproducing procedure indicated by the second scenario data generated by said control means in the second reproduction mode.

* * * * *